(12) United States Patent
Duffin et al.

(10) Patent No.: US 11,048,280 B2
(45) Date of Patent: Jun. 29, 2021

(54) PRESSURE REGULATOR

(71) Applicants: Don Duffin, Paul, ID (US); Roger Duffin, Paul, ID (US)

(72) Inventors: Don Duffin, Paul, ID (US); Roger Duffin, Paul, ID (US)

(73) Assignee: XCAD VALVE AND IRRIGATION, INC., Paul, ID (US)

( * ) Notice: Subject to any disclaimer, the term of this patent is extended or adjusted under 35 U.S.C. 154(b) by 0 days.

(21) Appl. No.: 16/425,384

(22) Filed: May 29, 2019

(65) Prior Publication Data
US 2019/0278307 A1 Sep. 12, 2019

Related U.S. Application Data

(63) Continuation of application No. 16/261,987, filed on Jan. 30, 2019, now Pat. No. 10,429,859.

(60) Provisional application No. 62/774,767, filed on Dec. 3, 2018, provisional application No. 62/740,832, filed on Oct. 3, 2018.

(51) Int. Cl.
*F16K 31/14* (2006.01)
*G05D 16/06* (2006.01)

(52) U.S. Cl.
CPC ..... *G05D 16/0663* (2013.01); *G05D 16/0661* (2013.01); *Y10T 137/7782* (2015.04); *Y10T 137/7808* (2015.04)

(58) Field of Classification Search
CPC ......... Y10T 137/7808; Y10T 137/7782; Y10T 137/7798
See application file for complete search history.

(56) References Cited

U.S. PATENT DOCUMENTS

| | | | | |
|---|---|---|---|---|
| 3,692,047 | A * | 9/1972 | Camp | G05D 16/0655 137/495 |
| 4,516,600 | A * | 5/1985 | Sturman | F16K 31/52 137/220 |
| 6,374,853 | B1 * | 4/2002 | Callies | G05D 16/0608 137/495 |
| 6,752,169 | B2 * | 6/2004 | Callies | F16K 17/0413 137/495 |
| 6,758,238 | B2 ‡ | 7/2004 | Callies | G05D 16/0608 137/49 |
| 6,923,205 | B2 * | 8/2005 | Callies | F16K 17/0413 137/495 |
| 8,567,433 | B2 * | 10/2013 | Ungerecht | F16K 1/123 137/505.25 |

(Continued)

OTHER PUBLICATIONS

Office Action dated Mar. 15, 2019 in U.S. Appl. No. 16/261,987.
Initial claims submitted with U.S. Appl. No. 16/261,987 on Jan. 30, 2019.

*Primary Examiner* — Robert K Arundale
(74) *Attorney, Agent, or Firm* — Scott D. Swanson; Shaver & Swanson, LLP

(57) ABSTRACT

What is disclosed is a pressure regulator having a mechanism to turn fluid flow through the pressure regulator on or off. The pressure regulator incorporates an actuator by which fluid flow to a pressure chamber that controls the linear movement of a flow tube is selectively actuated from one of a downstream supply and a pressurized fluid supply, such as an upstream supply. The actuator can be a manual, electromechanical, hydraulic or other form of actuator.

11 Claims, 16 Drawing Sheets

(56) References Cited

U.S. PATENT DOCUMENTS

| | | | | |
|---|---|---|---|---|
| 8,678,029 B2* | 3/2014 | Ungerecht | .............. | F16K 1/123 |
| | | | | 137/505.25 |
| 2003/0192596 A1* | 10/2003 | Ford | .................... | G01F 15/005 |
| | | | | 137/495 |
| 2011/0174394 A1* | 7/2011 | Kristoffersen | ......... | G05D 7/005 |
| | | | | 137/505 |

* cited by examiner
‡ imported from a related application

PRESSURE REGULATOR

PRIORITY/CROSS-REFERENCE TO RELATED APPLICATIONS

This application is a continuation of U.S. Non-provisional application Ser. No. 16/261,987, filed Jan. 30, 2019, which claims the benefit of U.S. Provisional Application No. 62/740,832 filed Oct. 3, 2018, and U.S. Provisional Application No. 62/774,767, filed Dec. 3, 2018, the disclosures of which are each incorporated by reference.

TECHNICAL FIELD

The disclosure generally relates to the field of irrigation pressure regulators. Particular embodiments relate to a pressure regulator with an on/off function.

BACKGROUND INFORMATION

Pressure regulators are utilized in a variety of irrigation systems. For example, pressure regulators function to maintain a predetermined pressure and/or lower pressure generally downstream of a main or primary irrigation line. For example, a pressure regulator is often used to regulate water pressure from a primary irrigation line to a sprinkler. What is needed is a mechanism for turning the flow of fluid on and off at the pressure regulator and preferably an actuating mechanism that inherently drains when fluid is removed from the system.

SUMMARY

Figure 1:
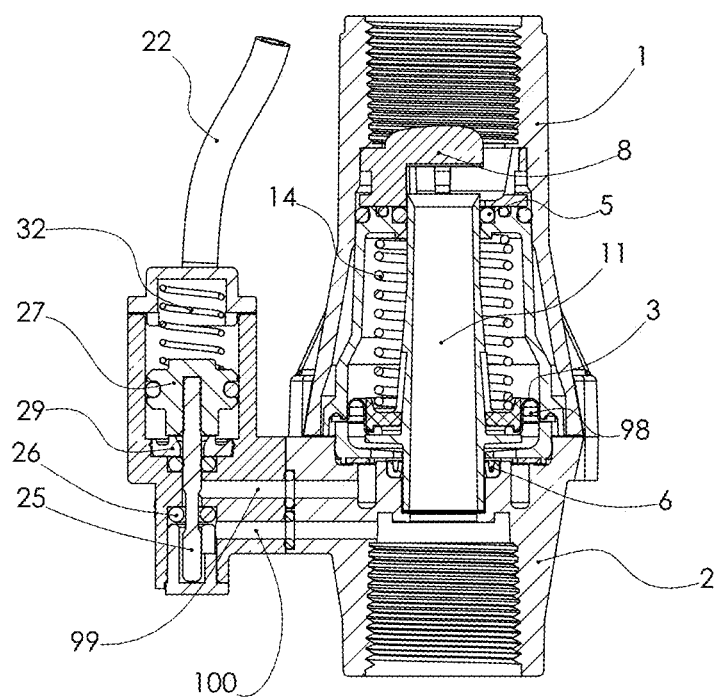
FIG. 1 is a cross sectional view of a pressure regulator having a hydraulic actuator in the on position.

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

In a preferred embodiment the pressure regulator has a housing assembly defining a fluid flow path from an input end to an output end. The pressure regulator serves to regulate the pressure of fluid downstream of the pressure regulator. The term fluid is used generically herein to define a fluid or a gas the flow of which can be regulated with a pressure regulator. Fluid that has been pressure regulated is defined herein as a downstream fluid supply. The pressure regulator has a tubular flow tube supported within said housing assembly. The tubular flow tube defines a fluid flow path from the first end of the tubular flow tube to a second end of the tubular flow tube.

The pressure regulator includes a pressure chamber defined by a diaphragm extending between the housing assembly and the tubular flow tube. The diaphragm provides a fluid tight seal in defining a wall of the pressure chamber. In a preferred embodiment the diaphragm circumvolves the flow tube and the pressure chamber similarly circumvolves the flow tube. The tubular flow tube is configured for linear movement toward and away from a valve seat in response to fluid pressure on the diaphragm from the pressure chamber.

The pressure chamber has a fluid port configured to deliver fluid to the pressure chamber. Generally this fluid port is located within a wall of the housing assembly that defines the pressure chamber. The pressure regulator utilizes an actuator that is configured to selectively distribute fluid to the fluid port from one of a pressurized fluid supply and a downstream fluid supply. The actuator can be in a variety of forms, including a manual actuator, an electromechanical or electronic actuator (herein collectively called an electromechanical actuator) such as a solenoid, and a hydraulic actuator.

When the actuator is delivering fluid from downstream fluid flow the pressure in the pressure chamber is governed by the downstream flow pressure of the regulator. The flow tube is configured to linearly adjust to allow varying amounts of fluid through the pressure regulator which allows the regulator to effectively self adjust until the desired pressure is met. In a preferred and typically standard embodiment, a spring is utilized that exerts opposing force on the flow tube than the force exerted on the flow tube by pressure on the diaphragm. The spring further serves to bias the flow tube and the seat apart when the pressure regulator is not connected to a fluid supply or when fluid is not flowing through the system.

When the pressure regulator is in operation, the spring compresses and the opening between the seat and the flow tube narrows, until the spring compression reaches a preset or predetermined amount of pressure for which the spring has been selected, thus regulating the system. The downstream fluid supply can be taken from any point downstream of the opening between the seat and the flow tube, although in a preferred embodiment the port is positioned in the housing assembly downstream of the flow tube.

When the actuator is delivering fluid from an external or upstream source to the pressure regulator the pressure chamber fills with fluid. The pressure from the fluid in the fluid chamber acts on the diaphragm causing the diaphragm and attached flow tube to move linearly toward the seat. When the flow tube meets the seat the flow of fluid through the flow tube is blocked, thus effectively "turning off" the flow through the pressure regulator. Preferably the actuator is configured to provide fluid from the pressure chamber from a source upstream of the pressure regulator.

The pressure regulator has a seal positioned between the tubular flow tube and the housing assembly. The seal allows for linear movement of the tubular flow tube relative to housing assembly while preventing fluid from the pressure chamber from traveling around the tubular flow tube and out of the pressure chamber via the output. Preferably this seal is a chevron seal.

In a preferred embodiment utilizes an actuation chamber in fluid connection with the fluid port. The actuation chamber has a first fluid inlet and a second fluid inlet. The first fluid inlet is configured to receive fluid from the pressurized fluid source. The second fluid inlet is configured to receive fluid from the downstream fluid supply. The actuator is configured within the chamber to selectively allow fluid from the first fluid inlet or the second fluid inlet to enter the actuation chamber and thus to the fluid port and the pressure chamber.

In a preferred embodiment the hydraulic actuator includes a piston chamber in fluid connection with the pressurized fluid supply. The piston chamber is in sealable fluid connection with the fluid port to the pressure chamber. The fluid port to the pressure chamber is in sealable connection with the downstream fluid supply port. The piston chamber houses a piston connected to a plunger such that the piston and plunger are configured to move between an open position and a closed position. When the piston and plunger are in the open position the plunger is configured to seal the sealable connection between the piston chamber and the fluid port to the pressure chamber. The connection between the fluid port and the downstream fluid supply is open allowing downstream fluid to enter the pressure chamber and the pressure regulator functions to regulate the pressure of the fluid passing through the pressure regulator. In the closed position the plunger is configured to seal the sealable connection between the fluid port to the pressure chamber and the downstream fluid supply port and the connection between the fluid port to the pressure chamber and the pressurized fluid supply is open, thus allowing the pressurized fluid supply to enter the pressure chamber and to close the pressure regulator.

In this embodiment the piston and plunger are configured to move from the open position to the closed position in response to fluid pressure from the pressurized fluid supply. Typically a valve independent from the pressure regulator is utilized to control fluid flow from the pressurized fluid supply to the pressure regulator, although this valve could be incorporated into the pressure regulator at the entrance of the pressurized fluid supply to the piston chamber. In a preferred embodiment fluid from the pressurized fluid supply enters the piston chamber and begins filling the piston chamber. This causes the piston to rise thus moving both the piston and the plunger upward. The piston and plunger can be separate elements that are connected or a unitary element. In a preferred embodiment a spring biases the piston and plunger in an open position with the spring configured or selected with a resistance that is configured to be overcome when the fluid from the pressurized fluid supply is filling the piston chamber.

In a preferred embodiment the sealable connection between the piston chamber and the fluid port to the pressure chamber utilizes an o-ring. In the open position the piston is in sealed connection with the o-ring between the piston chamber and the fluid port to the pressure chamber thus preventing fluid flowing from the pressurized fluid supply via the piston chamber to the fluid port to the pressure chamber. An o-ring is provided as the sealable connection between the fluid supply port to the pressure chamber and the downstream fluid supply port such that in the "closed" position the plunger is in sealed connection with this o-ring to prevent fluid flow from the piston chamber to the pressure chamber from flowing out the port to the downstream fluid supply.

In a preferred embodiment the pressure regulator utilizes a solenoid actuator. The solenoid preferably is a pulse actuated solenoid that moves between an open position and a closed position in response to an electrical pulse from a controller. The solenoid functions in a similar manner to hydraulic function above. In a preferred embodiment an electrical pulse generates a magnetic field in the solenoid which causes the solenoid piston to move from a closed position to an open position or alternatively from an open position to a closed position. In the open or on position the solenoid piston is blocking flow from the pressurized fluid supply from entering the solenoid chamber and/or the port to the diaphragm chamber. In a preferred embodiment a seal, preferably rubber, is positioned on top of the piston and comes into contact with a seat positioned at the top of the piston chamber. In the open position (or regulating position) the seal is in contact with the seat closing flow input in to the piston chamber from the pressurized fluid supply. A fluid connection is established between the downstream fluid supply and the diaphragm chamber and the pressure regulator is regulating pressure of fluid flow through the pressure regulator. In the off position the solenoid piston has moved such that downstream fluid flow to the diaphragm chamber has been blocked. In a preferred embodiment a seal is positioned either on the bottom of the piston or proximate to the opening to a port to a downstream fluid supply. In the closed position (or off position) the piston and seal operate to prevent flow from the piston chamber to the port to the downstream fluid supply. In this position the pressurized fluid supply is in fluid connection with the diaphragm chamber, pressure builds in the diaphragm chamber, and the pressure on the diaphragm moves the flow tube into connection with the seat, thus the closing the opening between the seat and the flow tube.

In an alternate embodiment the pressure regulator utilizes a manual actuator. In an embodiment the manual actuator utilizes a spool positioned in a spool housing. The spool is configured to rotate about an axis and to move linearly along the axis when rotating between a closed position and an open position in the spool housing. In the closed position the spool is configured to allow fluid flow from a pressurized fluid supply port to the fluid port to the pressure chamber and to prevent flow from the downstream fluid supply port to the fluid port to the pressure chamber. In the open position the spool is configured to allow fluid flow from the downstream fluid supply port to the fluid port and to prevent fluid flow between said pressurized fluid supply port to said fluid port. In the open position the spool rotates to unblock the fluid path between the downstream fluid supply port and the fluid port to the pressure chamber.

In a preferred embodiment the spool utilizes a first seal and a second seal to prevent fluid flow in the open and closed positions. In this embodiment the first seal and the second seal are positioned apart on the spool. The spool further defines a spool passageway between the first seal and the second seal and around the spool. This allows fluid to flow between the pressurized fluid supply and the pressure chamber in a closed position. Fluid flowing from the pressurized fluid supply flows through the passageway around the spool to the fluid port to the pressure chamber. The seals prevent fluid from escaping the passageway in the closed position. In the open position the spool is positioned such that fluid is allowed to flow from the downstream fluid supply port to the fluid port to the pressure chamber at a position exterior to the spool such that the second seal prevents fluid from flowing into the spool passageway.

DETAILED DESCRIPTION OF THE EXEMPLARY EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

In the following description and in the figures, like elements are identified with like reference numerals. The use of "e.g.," "etc.," and "or" indicates non-exclusive alternatives without limitation unless otherwise noted. The use of "including" means "including, but not limited to," unless otherwise noted.

FIGS. 1-5 illustrate an embodiment of a pressure regulator utilizing a hydraulic actuated on/off function. FIG. 1 depicts a cross section view of a pressure regulator having a hydraulic on/off control in a pressure regulating function in which the pressure regulator is in the "on" or regulating function. The pressure regulator utilizes a housing having an input 1 and an output 2. In general, a fluid (such as fluid in an irrigation line) enters the pressure regulator at the input housing, flows through the flow tube 11, and is discharged through the discharge housing 2.

In the on or open position, fluid flows through the pressure regulator tube 11 and through the output and toward a sprinkler or other irrigation line. The spring 14 generally biases the flow tube 11 in an open position, meaning with the spring extended and the tube biased away from the seat 8. As fluid flows through the flow tube 11, the fluid reaches a downstream sprinkler or other flow limiting device and pressure builds in the line downstream of the regulator. Typically pressure regulators include a diaphragm chamber 98 that is in fluid contact with the downstream flow from the regulator. As the downstream pressure builds, it also increases in the diaphragm chamber causing the pressure to act on the surface of the diaphragm 3 applying an opposing force on the flow tube and spring 14. The diaphragm is generally a disc shape that circumvolves the flow tube whereas similarly the diaphragm chamber circumvolves the flow tube. The diaphragm chamber is not in fluid connection with fluid upstream from the pressure regulator. When the downstream pressure rises to a point to overcome the pressure from the spring holding the flow tube open, the spring begins to compress thus narrowing the opening between the flow tube and the seat. The spring compresses until it reaches its preset or preselected pressure point at which the gap between the seat is such that an amount of fluid is allowed through the opening to obtain a predetermined downstream pressure.

The on/off function depicted in FIG. 1 utilizes an upstream fluid input 22 to actuate the on/off function of the depicted pressure regulator. In the on (or regulating) position, upstream fluid flow into and through tube 22 is not occurring. Spring 32 biases piston 27 and plunger 25 into an open (or on or regulating) position such that ports 99, 100 are in fluid connection but not in connection with upstream flow 22 or piston chamber 40. Upstream fluid flow from tube 22 is shut off and the chamber surrounding the piston 27 is sealed off from ports 99 and 100. Plunger 25 is displaced away from o-ring 26 allowing fluid to flow between port 99 and 100. Plunger 25 has sealed the opening between the piston chamber and upper o-ring 39. This allows for downstream pressure buildup via port 100 and port 99 in the diaphragm chamber 98 to act on the diaphragm 3 and the regulator operates in regulating downstream pressure.

Figure 2:
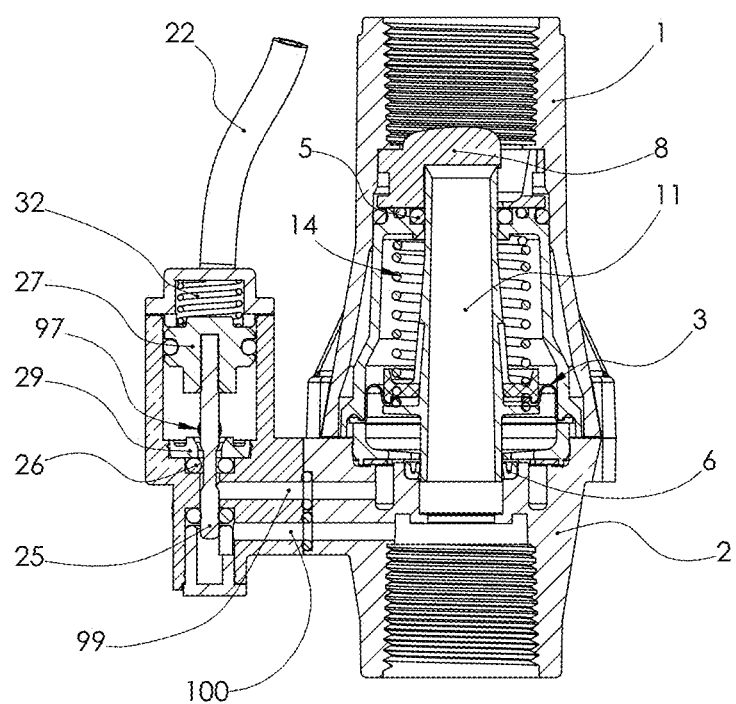
FIG. 2 is a cross sectional view of a pressure regulator having a hydraulic actuator in the off position.

FIG. 2 depicts the pressure regulator of hydraulic control in a closed (or off) position. From the open position depicted in FIG. 1 a pressurized fluid supply is introduced via tube 22. Fluid flows into the piston chamber (alternatively called a piston housing) surrounding the piston from tube 22 via port 97 shown partially in FIG. 2 and begins filling the piston chamber causing the piston to rise and thus compressing spring 32. Piston o-ring 33 prevents fluid from escaping the piston chamber toward the spring and allows for pressure build up within the piston housing. When sufficient pressure has built up the pressure overcomes the resistance of the spring and the piston and plunger move upward. This upward movement opens the sealable connection between the piston chamber and the fluid port to the diaphragm pressure chamber. The upward movement of the plunger further brings the lower end of (distal end from the piston) in position to seal the connection between port 99 and port 100 preventing fluid flowing between the diaphragm chamber and port 99 from flowing to port 100.

Fluid continues to flow to port 99 from the piston chamber around the plunger and eventually will equalize with the upstream fluid pressure from tube 22. The upstream fluid pressure from port 99 acts on the diaphragm connected to the flow tube 11 and displaces the diaphragm and flow tube toward the seat 8. When the end of the flow tube reaches the seat 8, fluid is prevented from flowing through the flow tube at the meeting of the flow tube and the seat thus the regulator is in an "off" position. A seal 6 is positioned between the flow tube and the walls of the regulator to prevent fluid from passing from the diaphragm chamber into the downstream port of the regulator. While an o-ring or similar gasket can be used for this seal, in a preferred embodiment this seal is a chevron seal.

In the off position port 100 is blocked or disconnected from fluid contact with port 99. When the pressure regulator is changed to a regulating (or on) position (allowing fluid flow through the tube 11), port 100 and 99 are in fluid connection allowing pressure from the spring 14 to open the flow tube thus allowing fluid to pass from the input through the flow tube.

Figure 6:
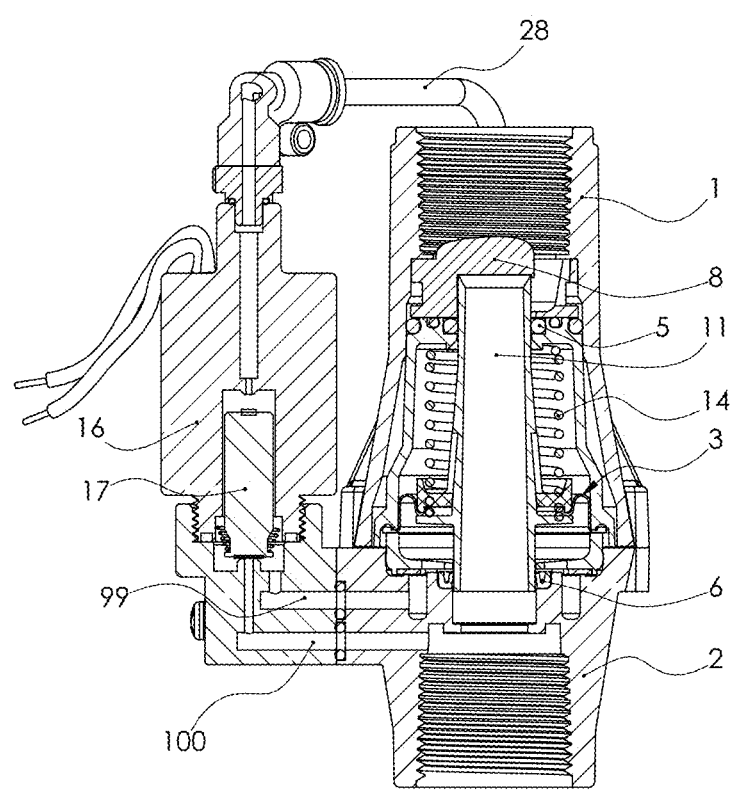
FIG. 6 is a cross sectional view of a pressure regulator having an electromechanical actuator utilizing a solenoid in the off position.

FIGS. 6-12 illustrate an embodiment of a pressure regulator utilizing an electronic or electromechanical actuated on/off function with the depicted embodiment utilizing a solenoid. FIG. 6 depicts an electric control on/off pressure regulator in a closed position. In the closed position, an electrical impulse has caused the on/off function to close by causing the solenoid piston 17 to move to a closed position. The solenoid can utilize a continuous electrical flow to remain closed or open, however in a preferred embodiment an electrical pulse utilizing solenoid is utilized. This type of solenoid operates to change the valve from an open position to a closed position in response to a pulse of electricity typically from a controller. In the depicted closed position, the solenoid piston 17 is blocking flow from port 99 to port 100 yet allowing upstream fluid input from input tube 28 to flow into port 99 via an unblocked opening (not shown in FIG. 6).

The upstream fluid flow builds pressure in port 99 and in the diaphragm chamber or void 98, thus exerting pressure on the diaphragm 3. This forces the diaphragm and flow tube 11 toward seat 8 and eventually closes until the flow tube and seat are in contact, thus blocking the flow of fluid through the pressure regulator.

Figure 3:
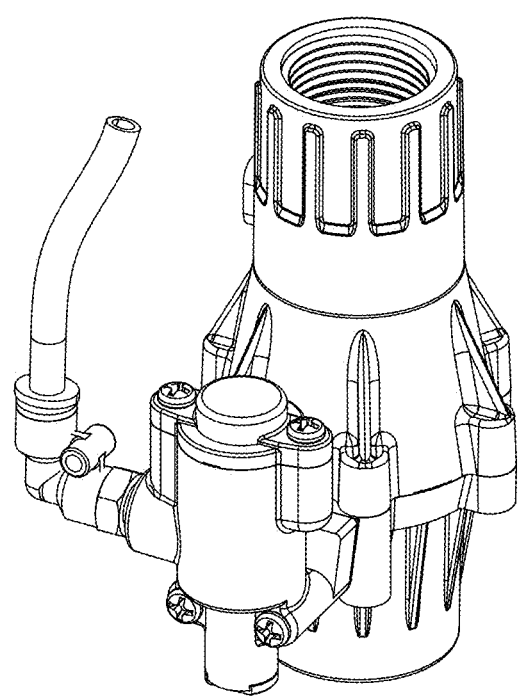
FIG. 3 is an external isometric view of a pressure regulator having a hydraulic actuator.
Figure 4:
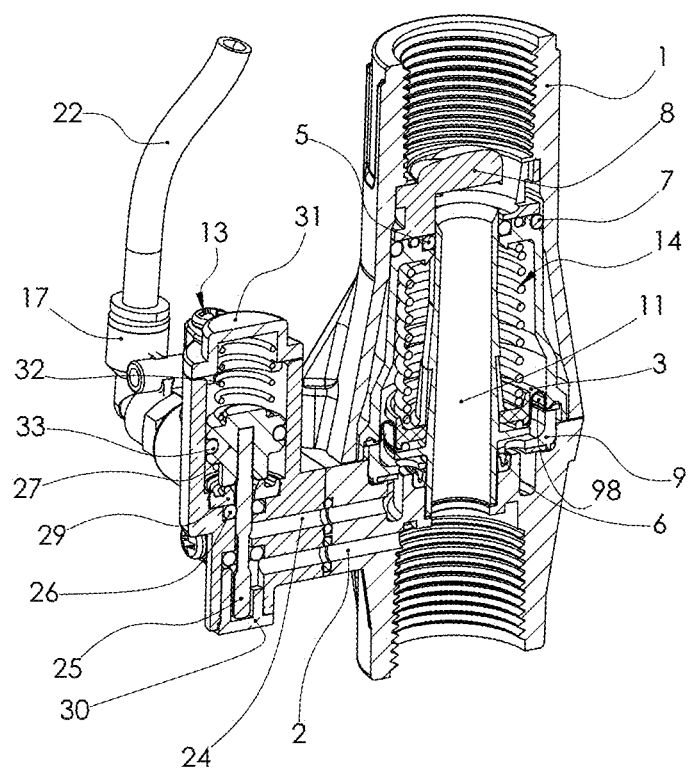
FIG. 4 illustrates a cross-sectional isometric view of a pressure regulator having a hydraulic actuator.
Figure 5:
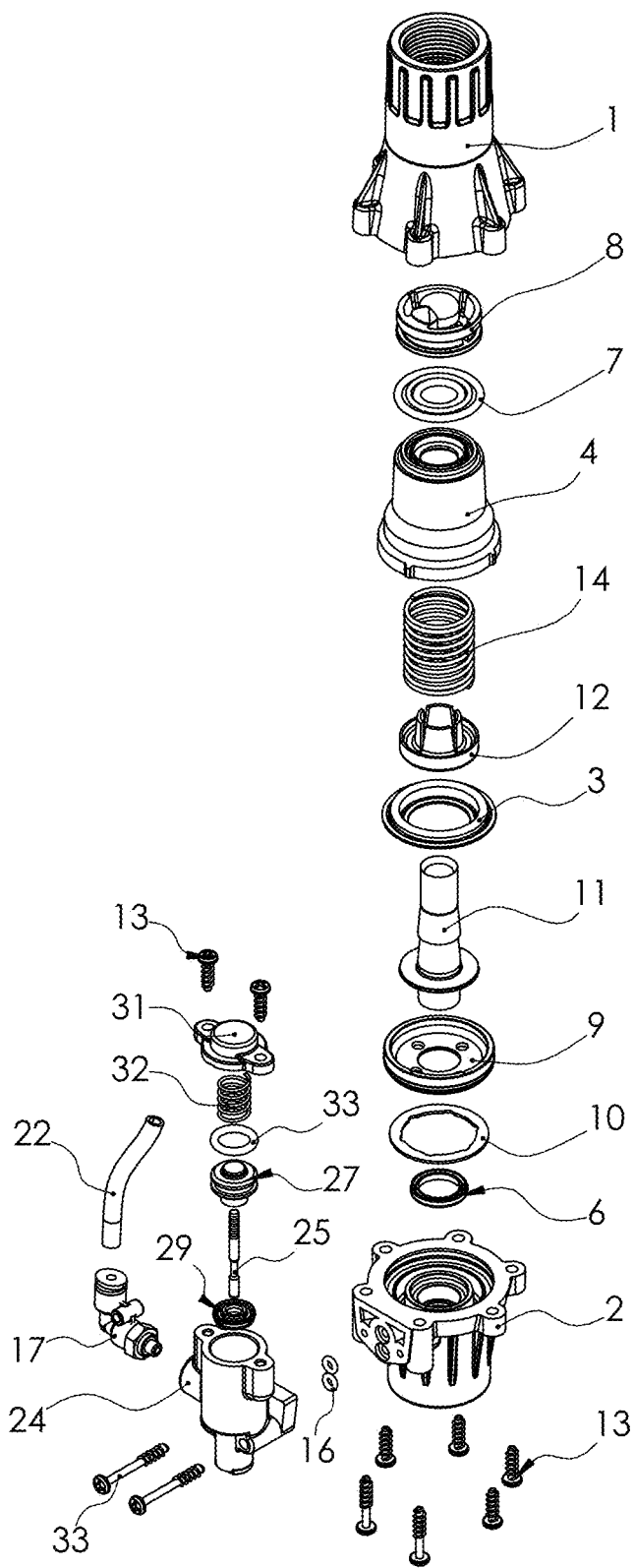
FIG. 5 illustrates an exploded view of a pressure regulator having a hydraulic actuator.
Figure 7:
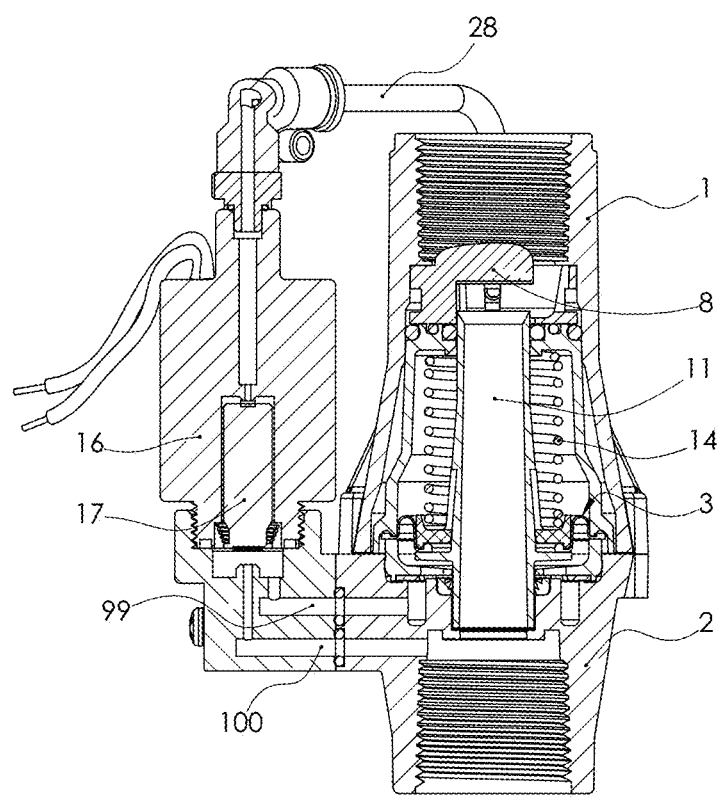
FIG. 7 is a cross sectional view of a pressure regulator having an electromechanical actuator utilizing a solenoid in the on position.

FIG. 7 depicts the on/off electric function of FIG. 3 in a regulating (or on) position. In the regulating position, the solenoid has received electricity from a controller (not shown) causing the solenoid to move the piston upward and away from the opening to port 100, thus fluidly connecting port 99 and port 100. Fluid flow from input tube 28 into the diaphragm chamber has ceased. The regulator is in a pressure regulating position allowing the flow tube to move in response to pressure from the downstream flow of fluid in the downstream system (as discussed above).

Figure 9:
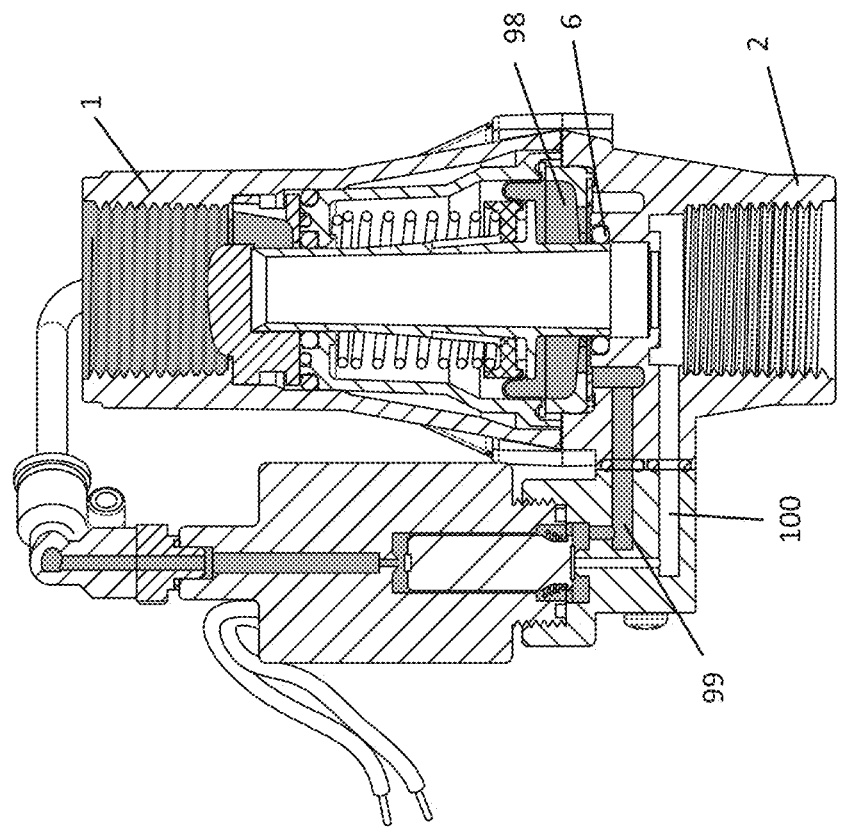
FIG. 9 is a cross sectional view of a pressure regulator having an electromechanical actuator in the off position further illustrating the presence of fluid in the off position.
Figure 8:
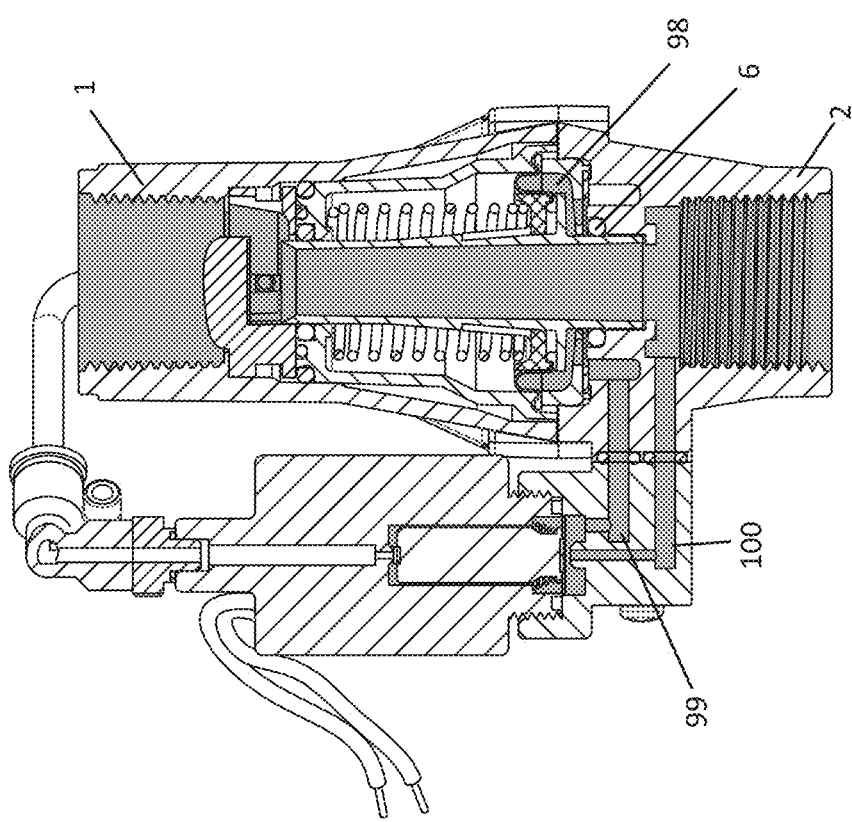
FIG. 8 is a cross sectional view of a pressure regulator having an electromechanical actuator in the on position further illustrating the presence of fluid in the on position.
Figure 10:
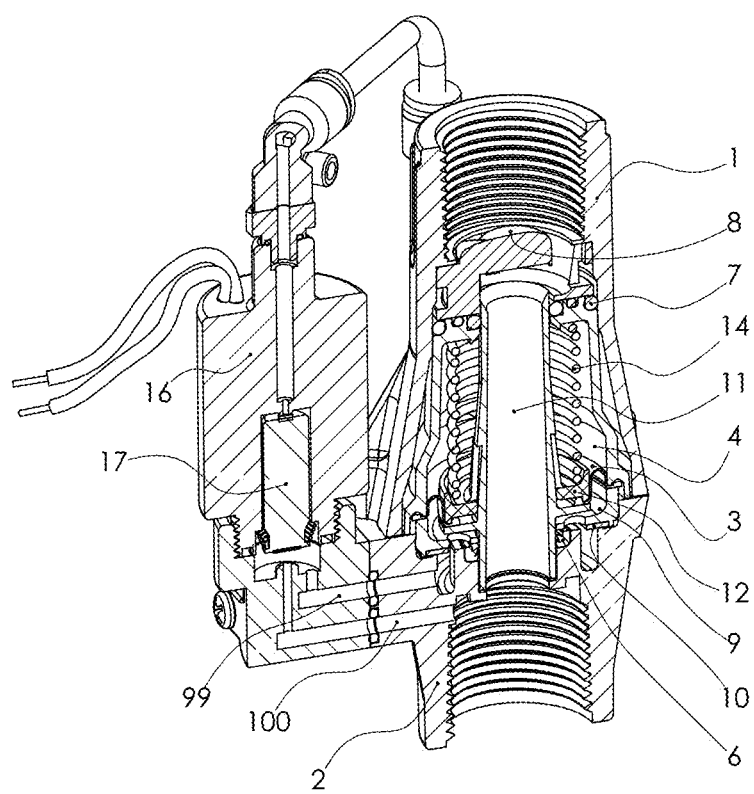
FIG. 10 illustrates a cross-sectional isometric view of a pressure regulator having an electromechanical actuator utilizing a solenoid in the on position.
Figure 11:
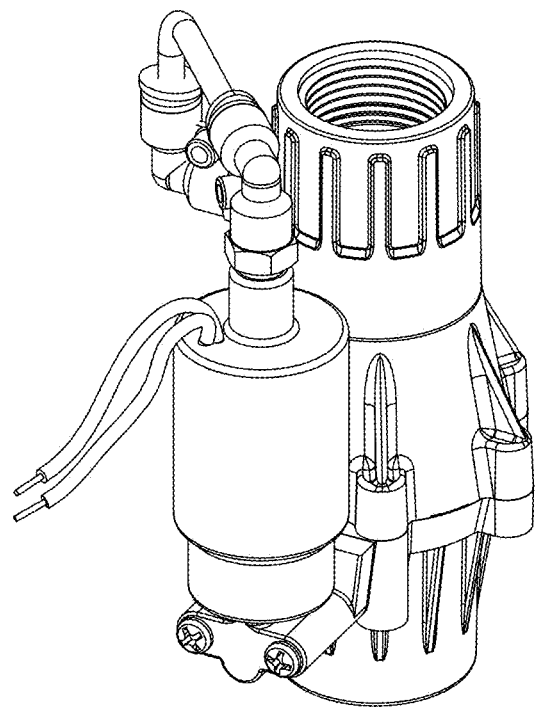
FIG. 11 is an external isometric view of a pressure regulator having an electromechanical actuator utilizing a solenoid.
Figure 12:
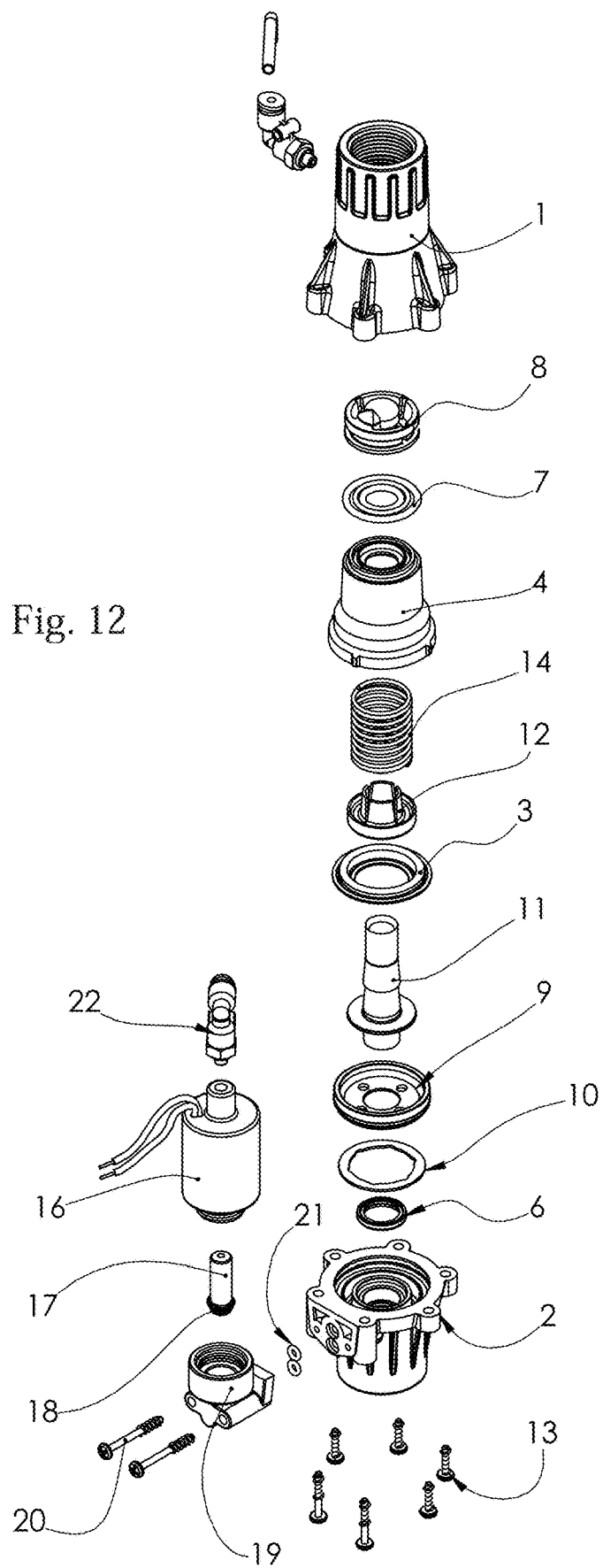
FIG. 12 illustrates an exploded view of a pressure regulator having an electromechanical actuator utilizing a solenoid.
Figure 13:
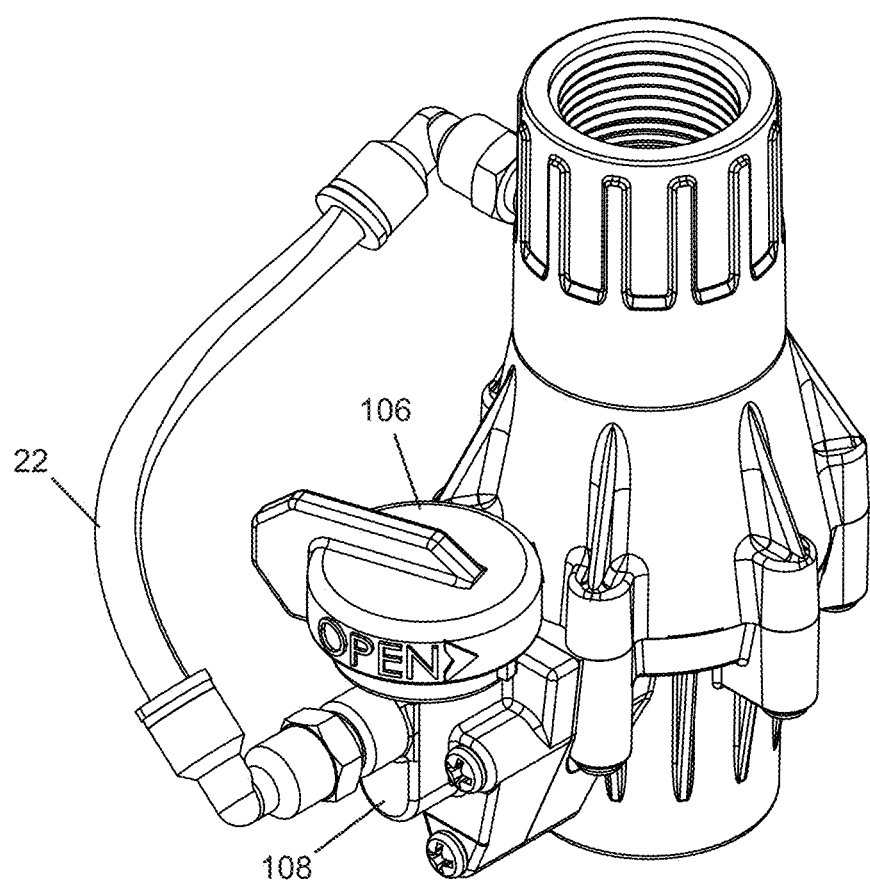
FIG. 13 is an external isometric view of a pressure regulator having an manual actuator.

FIGS. 8 and 9 illustrate a cross-sectional view of an electromechanical operated on/off function for a pressure regulator. The shading illustrates the flow of fluid in each of the FIGS. 8 and 9. FIG. 8 illustrates an electromechanical control mechanism in the on or regulating position. FIG. 9 illustrates an electromechanical control mechanism in the off position. While the actuator is different, in general the principle behind the mechanism is similar whether it is electric actuated, hydraulic actuated as discussed above, or manual actuated as discussed below. An alternative actuator could be used than discussed herein that does not differentiate from the principles discussed herein. In the on or regulating position, downstream pressure builds at the sprinkler or other impediment, causing pressure to build at the pressure regulator. The downstream fluid and associated pressure flows through port (previously 100) and into port (previously 99) and into the diaphragm housing, thus imparting downstream pressure on the diaphragm. The diaphragm forces the movement of the flow tube toward the seat until a regulating pressure from the spring is met, as discussed above. In contrast, in FIG. 9 ports 99 and 100 are disconnected and port 99 is in connection with upstream fluid input the upstream pressure via port (previously 99) asserted on the diaphragm is stronger than the spring pressure, thus closing the flow tube against the seat and preventing the flow of fluid through the flow tube.

Figure 14:
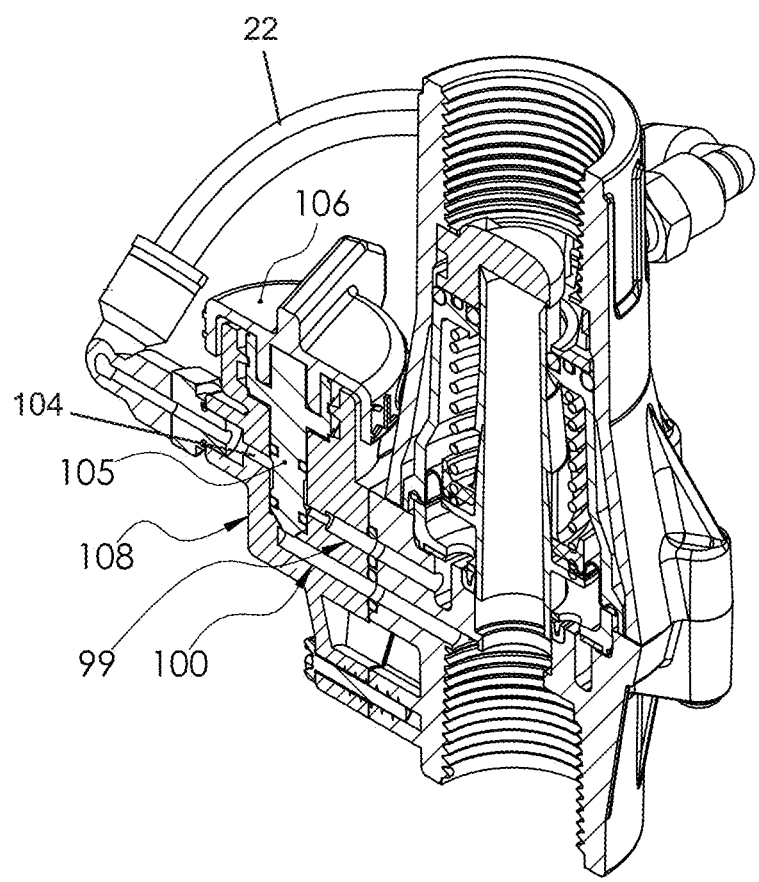
FIG. 14 is an isometric view of a cross section of a pressure regulator having an manual actuator in the off position.
Figure 15:
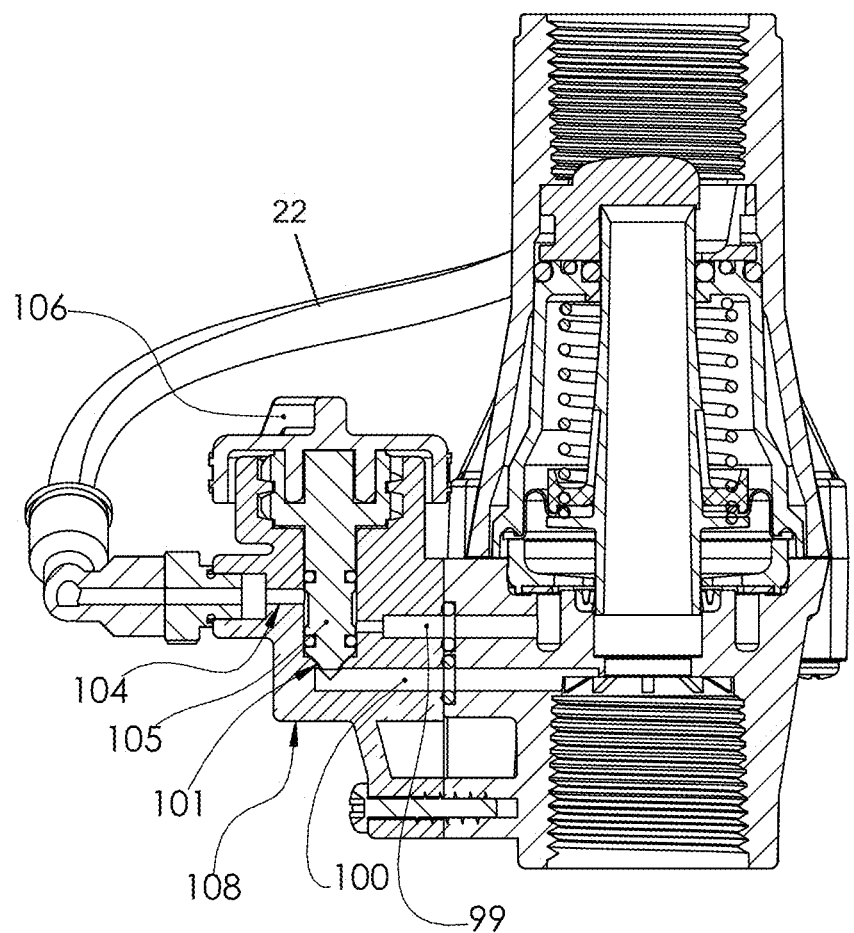
FIG. 15 is a cross sectional view of a pressure regulator having an manual actuator in the off position.

FIGS. 13 through 17 illustrate a pressure regulator having an on/off function having a manual actuator. In the depicted manual control embodiment a control lever raises and lowers a spool 105 when lever 106 is rotated. The threads of the spool engage with mated threads of the housing 108, which forms the walls of the spool chamber, such that rotation of the lever causes the threaded spool to rotate vertically. FIG. 14-15 illustrate the embodiment in a closed position in which upstream fluid flow is prevented from flowing through the regulator. The lever has been rotated to CLOSED position and port 104 (receiving upstream fluid via tube 22) is connected to port 99 thus allowing upstream fluid to act on the diaphragm (as discussed above) causing the flow tube to move toward the seat. Spool 105 is closed against seat 101 closing off port 100. This isolates and closes the diaphragm chamber from the downstream port and the valve closes.

Figure 16:
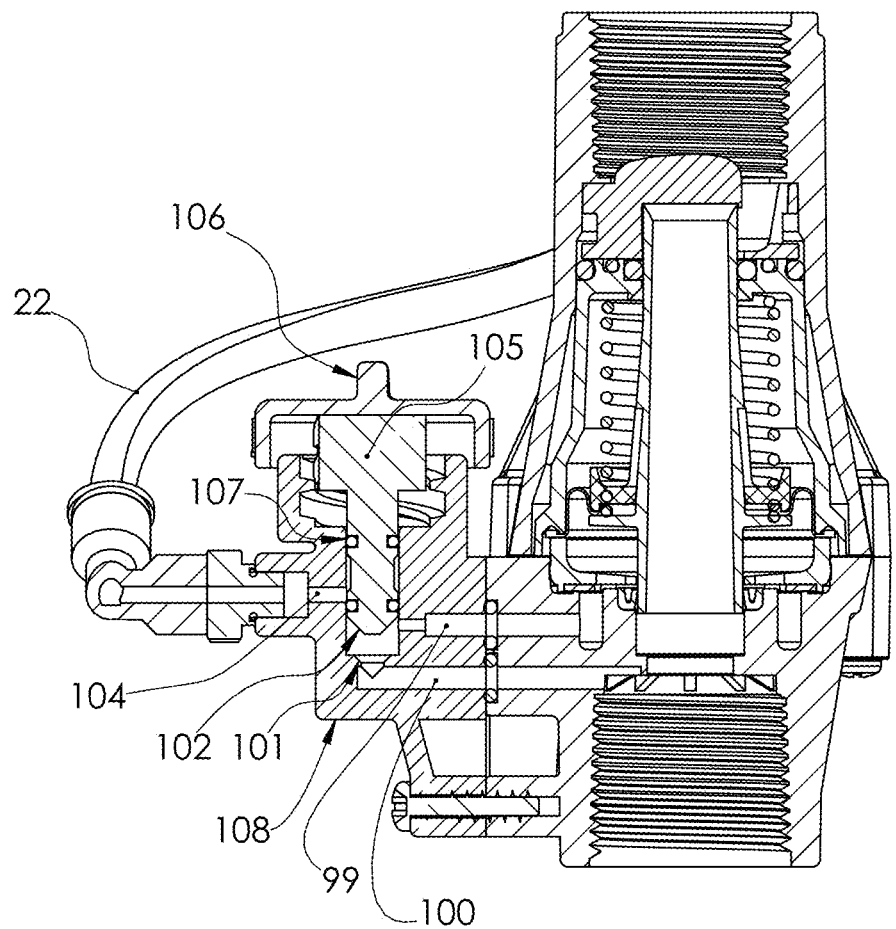
FIG. 16 is a cross sectional view of a pressure regulator having an manual actuator in the on position.
Figure 17:
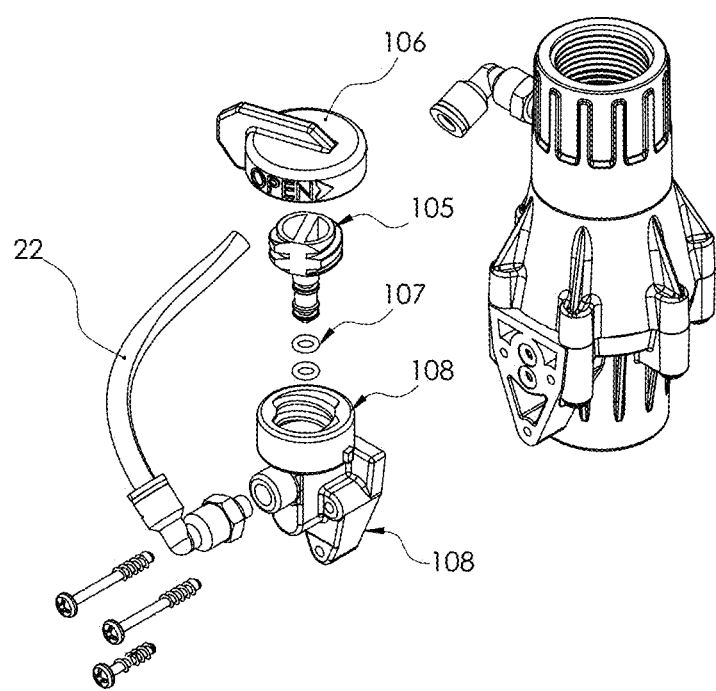
FIG. 17 is an exploded isometric view of a pressure regulator having an manual actuator.

FIG. 16 illustrates the depiction of the embodiment having a manual actuator in an open position in which the lever has been rotated to the OPEN position. The spool has been rotated upward and port 104 has been closed off by the spool. Ports 99 and 100 are connected allowing the regulator to open and control pressure as discussed above.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

We claim:

1. A pressure regulator with an on/off function, said pressure regulator comprising:
    a housing assembly defining a fluid flow path from an input end to an output end, wherein fluid output from said housing is defined as a downstream fluid supply;
    a tubular flow tube supported within said housing assembly, wherein said tubular flow tube defines a fluid flow path from a first tubular flow tube end to a second tubular flow tube end;
    a pressure chamber defined by a diaphragm extending between said housing assembly and said tubular flow tube, wherein said tubular flow tube is configured for linear movement toward and away from a valve seat in response to fluid pressure on said diaphragm from said pressure chamber;
    a fluid port configured to deliver fluid to said pressure chamber; and
    an actuator configured to selectively distribute fluid to said fluid port from one of a pressurized fluid supply and said downstream fluid supply, wherein in an open position said actuator is configured to distribute fluid from said downstream fluid supply to said fluid port and to prohibit fluid from said upstream fluid supply from entering said port, wherein in a closed position said actuator is configured to distribute fluid from said pressurized fluid supply to said fluid port and to prohibit fluid from said downstream fluid supply from entering said fluid port.

2. The pressure regulator of claim 1 further comprising a spring configured to bias said tubular flow tube away from said seat when said pressure regulator is free of fluid traveling through said pressure regulator.

3. The pressure regulator of claim 1 wherein said actuator is a manual actuator.

4. The pressure regulator of claim 1 wherein said actuator is an electromechanical actuator.

5. The pressure regulator of claim 4, wherein said electromechanical actuator comprises a solenoid.

6. The pressure regulator of claim 4 wherein said electromechanical actuator comprises a pulse actuated solenoid.

7. The pressure regulator of claim 1 wherein said actuator is a hydraulic actuator.

8. The pressure regulator of claim 1 wherein said regulator is configured to provide pressurized fluid supply from an upstream fluid source from said pressure regulator.

9. The pressure regulator of claim 1 wherein said pressure chamber circumvolves said tubular flow tube.

10. The pressure regulator of claim 1 wherein said pressure chamber comprises a seal positioned between said tubular flow tube and said housing assembly configured to allow for said linear movement of said tubular flow tube in said housing assembly and to prevent fluid from said pressure chamber from traveling around said tubular flow tube and out said output.

11. The pressure regulator of claim 10 wherein said seal comprises a chevron seal.

\* \* \* \* \*